United States Patent [19]

Hearn

[11] 3,764,165
[45] Oct. 9, 1973

[54] BAGGAGE CART
[75] Inventor: Leo E. Hearn, Flint, Mich.
[73] Assignee: Saginaw Products Corporation, Saginaw, Mich.
[22] Filed: Aug. 28, 1972
[21] Appl. No.: 284,157

Related U.S. Application Data
[62] Division of Ser. No. 94,891, Dec. 3, 1970, Pat. No. 3,727,946.

[52] U.S. Cl. .............................. 280/419, 280/408
[51] Int. Cl. ............................................ B62d 53/00
[58] Field of Search ............................. 280/419, 408

[56] References Cited
UNITED STATES PATENTS
| | | | |
|---|---|---|---|
| 776,994 | 12/1904 | Brennan | 280/419 X |
| 3,637,236 | 1/1972 | Shimoji | 280/419 |
| 3,689,106 | 9/1972 | Young | 280/408 X |
| 3,727,946 | 4/1973 | Hearn | 280/408 |

Primary Examiner—Leo Friaglia
Attorney—Learman & McCulloch

[57] ABSTRACT

A cart for supporting baggage containers and the like, including a frame supported on surface engaging wheels, a conveying platform rotatably mounted on the frame, apparatus on the frame and the platform cooperating to selectively lock the platform in various predetermined positions relative to the frame, latch assemblies at opposite ends of the conveying platform for securing opposite ends of a baggage container supported thereon, a steering tongue connected to each of the front and rear sets of wheels and pivotally coupled to a tow bar provided at each end, a releasable lock for selectively preventing relative movement of the steering tongue and the tow bar at either end of the cart to provide for selective locking and steering at either end so that when in train, the carts may be readily conditioned to steer from either end, and apparatus for releasably coupling the tow bar of one vehicle to the tow bar of an adjacent vehicle.

6 Claims, 13 Drawing Figures

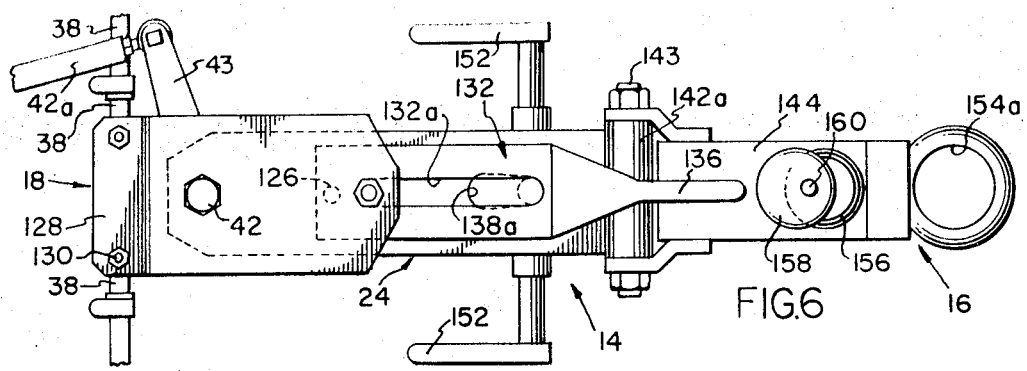
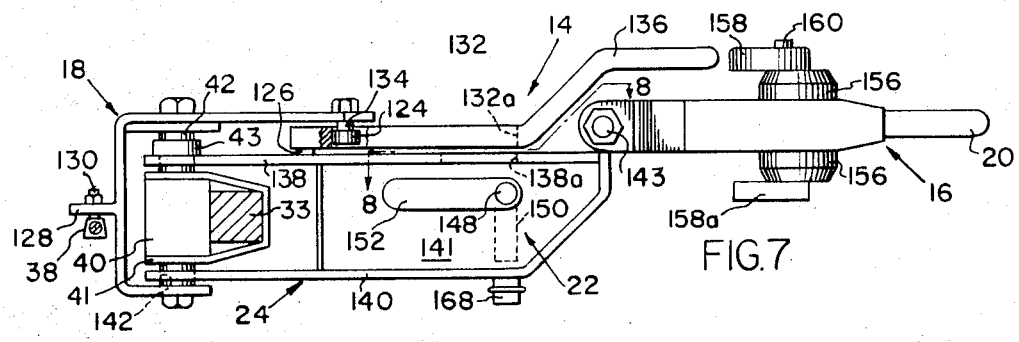

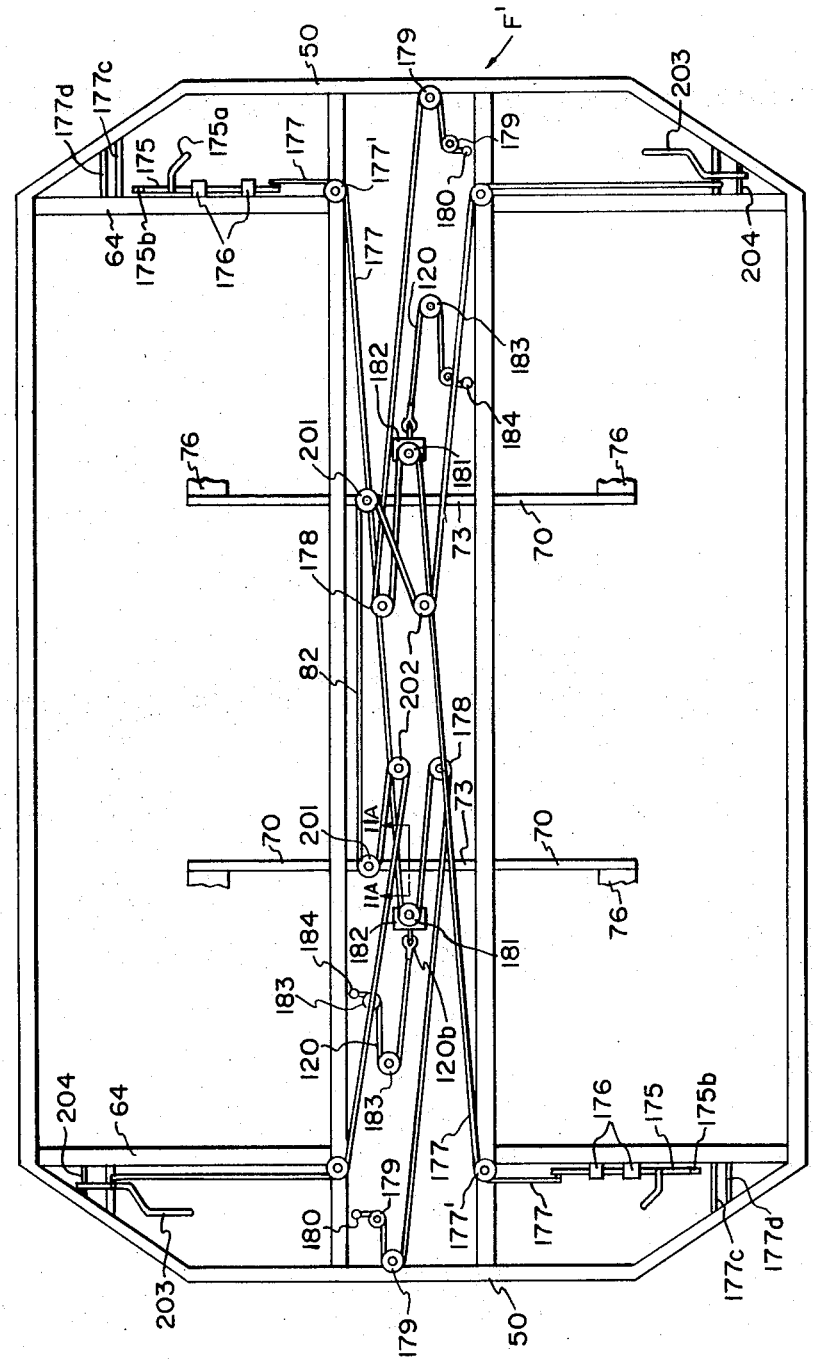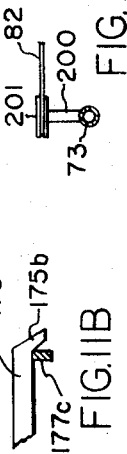

3,764,165

BAGGAGE CART

This is a division of application Ser. No. 94,891, filed on Dec. 3, 1970, now U.S. Pat. No. 3,727,946.

FIELD OF THE INVENTION

This invention relates to carts for transporting baggage containers of the type employed by commercial airlines at air terminals, and more particularly to new and improved apparatus of this character.

BACKGROUND OF THE INVENTION

Surface vehicles with rotatable load supporting turntables thereon have been provided in the past, however, the apparatus for locking the turntable relative to the frame in such prior devices has been inadequate for some purposes in that the turntable had to be precisely positioned before the locks or latches could be moved to locking positions. Accordingly, it is an object of the present invention to provide a cart with new and improved automatically latching apparatus for preventing relative rotation of a chassis and a rotatable platform supported thereon and which will automatically move to locking position as the rotatable platform reaches a pre-selected position.

Latch mechanism has also been provided on wheeled vehicles in the past for preventing the shifting of cargo thereon, however, in some instances, the baggage container must also be prevented from moving vertically. Accordingly, it is an object of the present invention to provide a new and improved latch assembly for use on a container cart which will limit both vertical and lateral movement of the container supported thereon.

Vehicles of the type disclosed herein are normally connected in tandem. The use of some conventional draw pins for connecting a vehicle tow bar to a draft vehicle has proved unsatisfactory because the draw pins are difficult to manipulate and also subject to being jarred out of draw bar receiving position when the vehicle negotiates a sharp bump. Because of this, auxiliary locking mechanism has been previously provided for such draw pins, however, in some instances, it has not permitted the trailers to be quickly disconnected. Accordingly, it is an object of the present invention to provide new and improved apparatus mounted on a tow bar which can quickly couple or decouple a tow bar to or from a draft vehicle.

When vehicles of the type disclosed herein are coupled in tandem and loaded with containers, it is frequently desirable to condition the carts for towing from an opposite end of the train and to unlock the tow bar from the steering tongue at one end of each cart while locking the tow bar at the opposite end to the opposite end steering tongue. Since some of the carts in the train will not be in front to rear alignment with the others and the unlocked tow bars may be slightly out of front to rear alignment with the steering tongues, it is desirable to shift the steering tongues to align with the tow bars in order to lock the tongues and tow bars which are to be locked and avoid any necessity for uncoupling tow bars. Also, in the coupling of a cart to a train, the same aligning frequently is necessary. This aligning is manually difficult because the weight of the loaded cart on the wheels prevents the wheels from turning easily so that the alignment can be achieved. Accordingly, it is an object of the present invention to provide a new and improved towing assembly for a container cart which will facilitate easy alignment of the tow bar with another vehicle.

For different applications, it is important that both side and end loading and unloading of the baggage carts be provided for. More particularly, baggage containers employed by commercial airlines are tapered along their front walls so as to generally conform to the shape of the slanting sidewalls inside an aircraft in which they are stored. Pairs of such baggage containers are generally positioned in the aircraft with their back walls abutting. When such containers are conveyed into an aircraft from serially connected carts, alternate containers must be turned end-for-end to facilitate their back-to-back positioning. Much time is lost if alternate carts must be uncoupled from the train and turned end-for-end. To avoid this, a container supporting turntable is supported on the cart to facilitate turning of the containers. As sometimes occurs, it is also necessary to remove a container off a cart which is tandemly connected with other carts. Rather than uncoupling the carts to permit endwise removal of the container, it is desirable to provide for side unloading. Accordingly, it is yet another object of the invention to provide a baggage container cart having a turntable thereon which is rotatable to and selectively lockable in a plurality of predetermined positions.

Other objects and advantages of the present invention will become apparent to those of ordinary skill in the art as the description thereof proceeds.

SUMMARY OF THE INVENTION

A cart for supporting baggage containers and the like comprising a chassis supported on road engageable wheels, a platform rotatably mounted on the chassis and adapted to support a baggage container thereon, releasable latch means mounted at opposite ends of the platform for clamping opposite ends of a container supported on the platform, releasable means on the platform and the chassis cooperating to prevent relative rotation of the platform and the frame, a steering tongue for steering at least one set of wheels, a tow bar for towing the vehicle connected with the tongue for pivotal movement, releasable means for preventing relative movement of the tow bar and tongue, and releasable means for coupling the tow bar of one vehicle to the tow bar of an adjacent vehicle.

The present invention may more readily be described by reference to the accompanying drawings in which:

FIG. 6 is a fragmentary top plan view showing a steering tongue and tow bar assembly only;

FIG. 7 is a partly sectional, side elevational view of the apparatus illustrated in FIG. 6;

FIG. 8 is a fragmentary top plan view of a portion of the tongue apparatus illustrated in FIGS. 6 and 7, taken along the line 8—8 of FIG. 7;

FIG. 9 is a side elevational view of the apparatus illustrated in FIG. 8 with parts being broken away to more clearly illustrate portions thereof;

Figure 1:
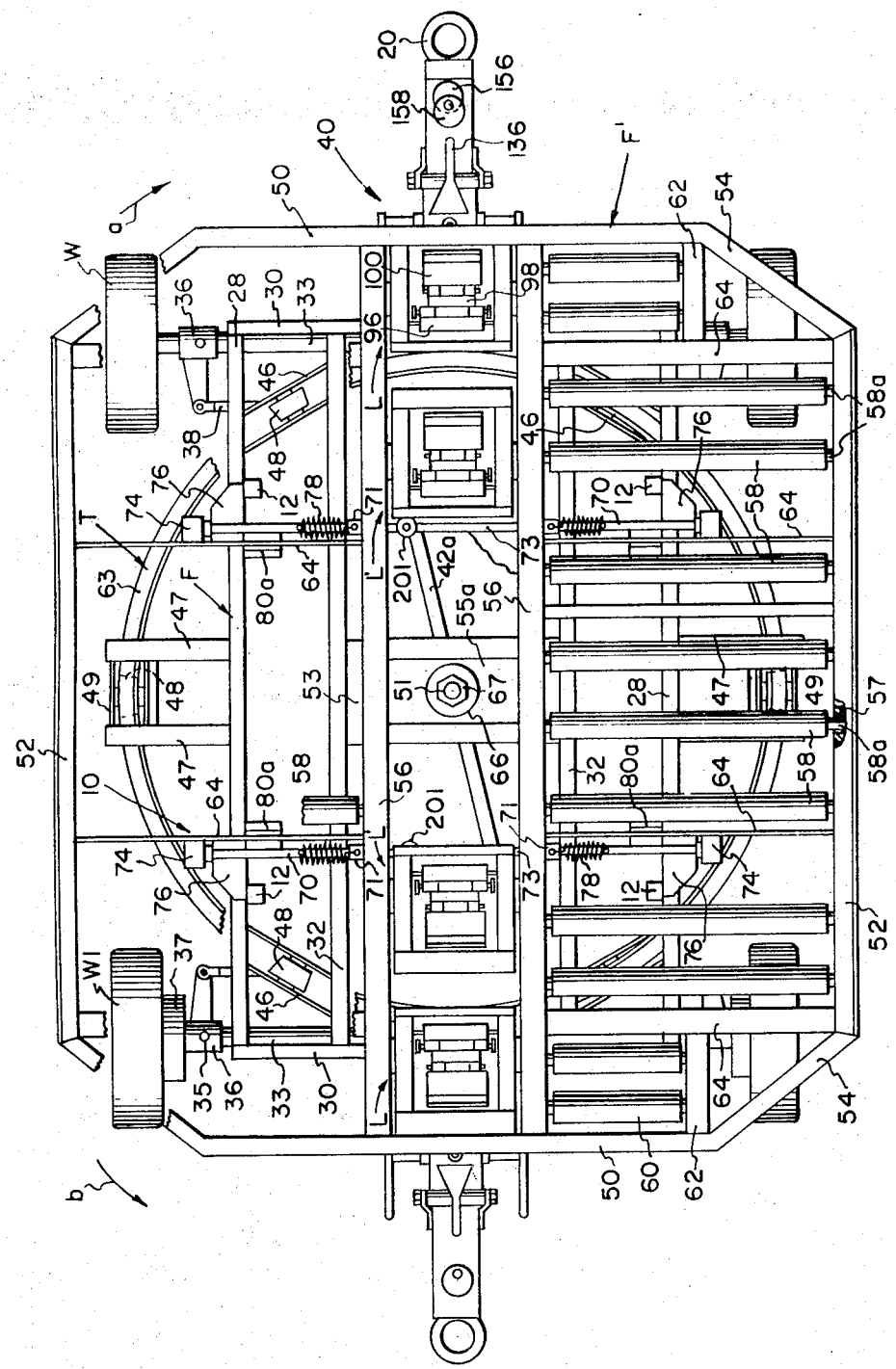
FIG. 1 is a top plan view of a baggage container cart constructed according to the present invention, parts being broken away to more clearly illustrate underlying portions thereof.

FIG. 10 is a side elevational perspective view particularly illustrating modified retaining mechanism for locking adjacent tow bars together; and FIG. 11 is a top plan fragmentary view particularly illustrating the mechanism for releasing the latches and turntable restraint members, whereas FIG. 11A is a sectional view, taken along the line 11A—11A of FIG. 11, and FIG. 11B is an enlarged side elevational view of one of the latch retainer bars.

GENERAL DESCRIPTION

Apparatus constructed according to the present invention is particularly adapted to be used with a vehicle, including a frame F supported on pairs of front and rear ground engaging wheels W and W1, respectively, and a platform or turntable T rotatably supported on the frame F. The turntable T includes four latch assemblies, each generally designated L, positioned to hold a container C thereon. A plurality of locking members, generally designated 10, are mounted on the turntable T and are reactable with a plurality of upstanding posts 12 on the frame F for locking the turntable T in certain predetermined positions relative to the frame F. For drawing the vehicle in either direction, a draft assembly, generally designated 14, is provided at each end of the vehicle and includes a steering tongue member 18 pivotally connected to a movable tongue assembly, generally designated 24, which pivotally supports a tow bar 16. The tow bar 16, and movable tongue assembly 24, can be swung relatively to the steering tongue assembly 18 so that an eye 20 on the tow bar 16 may be properly aligned with the draw bar of a draft vehicle. A movable coupling assembly, generally designated 22, is provided on the movable tongue assembly 24 for coupling the tow bar 16 and tongue assembly 24 to the steering tongue assembly 18 to prevent relative movement therebetween. A tow bar coupling device, generally designated 26, is supported on each tow bar for coupling the tow bars of adjacent vehicles.

FRAME AND PLATFORM ASSEMBLY

The vehicle chassis or frame F includes a pair of side rails 28 connected by a pair of end rails 30. A pair of longitudinally extending channel members 32 span the end rails 30 inwardly of the side rails 28. Four upstanding posts 12 are welded or otherwise suitably secured to the side rails 28 for cooperating with the platform lock assemblies 10 which are swingably mounted on the platform T for locking the platform T relative to the frame F in predesignated positions, as will later become apparent. Front and rear axles 33 are fixed to the undersides of the frame F. Conventional wheel mounting steering knuckle assemblies 36 with hubs 37 are pivotally connected to the axles 33 by king pins 35 and support the front and rear wheels W and W1 as usual. A plurality of tie rods 38 connect the knuckle assemblies 36 with the steering tongue assemblies, generally designated 18, at the front and rear of the vehicle (see FIG. 6), which are pivoted to the frame F by vertical king pins 42 (FIG. 7). The king pins 42 are journaled in bearings 40 fixed to the axles 33 by stirrup type mounts 41. A tie rod 42a (FIGS. 2 and 6) connects an arm 43 (FIGS. 6 and 7), fixed to each assembly 18, with the arm 43 at the opposite end of the cart to provide for steering the cart from either end of the vehicle with either tongue assembly 18.

The frame F has diagonal corner braces 46 (FIG. 1) spanning the side rails 28 and the adjacent beams 32 and mounting turntable supporting roller wheels 48.

Welded or otherwise suitably secured to each of the side rails 28 are transverse rails 47 spanned by rail members 49 mounting additional roller members 48.

The turntable or platform assembly T includes a conveyor frame F' having a pair of end frame members 50 connected with side frame members 52 by diagonal corner members 54. Additional longitudinally extending frame members 56 span the end frame members 50. Two rows of freely rotatable conveyor rolls 58 are rotatably supported on the frame F' and include reduced end portions 58a journaled in bearings 57 provided in the rails 52 and 56. Pairs of reduced length rollers 60 are journaled between the rails 56 and additional rails 62 connected between the end frame members 50 and additional cross members 64 spanning the members 56 and side frame members 52 of the frame F'. At the center of the frame F, an upstanding pivot pin or trunnion 51, which is fixed to a plate 53 on members 32, receives a bearing cage 66 that is fixed to a plate 55a spanning the frame members 56 of the turntable T. Vertical movement of the platform T is prevented by a nut 67 threaded on the bolt 51. Welded or otherwise suitably connected to the underside of the rails 56, is a circular track 63 which rides on the rollers 48 of the frame F. Disposed between the rails 56 are the latch members L which will be described more particularly hereinafter.

THE TURNTABLE LOCKING ASSEMBLY

The rotatability of the turntable or platform T permits rotation of the baggage container C to a position endwisely aligned with the frame F or a position crosswisely disposed thereto. Four stop plate assemblies, generally designated 10, are utilized at the four corners of the rotatable platform T for insuring that the container C will be stopped and locked in 90° turned positions, such that it faces either fore or aft, or to either side.

The rotatable stop plate assemblies 10 include elongated rods 70 journaled at opposite ends in brackets 71 provided on rails 56 and mounting brackets 74 fixed to cross rails 64 on the platform T. Welded, or otherwise suitably secured to one side of each stop plate mounting rod 70 are stop plates 76 which are engageable in lowered position with the upstanding frame bar members 12. A torsion spring 78 around each rod 70 is held at one end by a rail 64 and at its opposite end by the rod 70 for normally pivoting the stop plates 76 downwardly so that they will engage behind one of the stop pins 12 fixed to the chassis F. To prevent bowing of the rods 70 when torque is exerted on the locked turntable, welded to the opposite side of each rod 70 is an additional stop plate 80 (see FIG. 2), having an upwardly extending projection 80a thereon, for engaging one of the rails 64 on the platform F' when the stop plate 76 engages an upstanding member 12. In this construction, force is transmitted substantially linearly from the upstanding member 12 to the stop plate 76, the rod 70, the stop plate 80, and a rail 64 of the turntable frame F'. It will be noted that one of the stop plates 76 on each side of the frame will prevent the rotation of the turntable T clockwisely, in the direction represented by the arrow *a* in FIG. 1, whereas the other stop plate 76 on a particular side of the turntable T will prevent the rotation of the turntable in the opposite counterclockwise direction represented by the arrow *b* in FIG. 1. The rods 70 on each end of the turntable T are fixed to a tubular member 71 journaled in the fame members 56.

Mechanism is provided for pivoting the rods 70 simultaneously and swinging the members 76 to a position above the upstanding members 12 while swinging the members 80 to positions below the frame F' so that the turntable T may be rotated to the next position, and includes upstanding rods 200 fixed to tubular members 71 and journaling pulleys 201 at their upper ends. A cable 82 is trained around the pulleys 201 (FIG. 11) and additional pulleys 202 rotatably mounted on the frame F'. The opposite ends of the cable 82 are fixed to levers 203 pivoted on frame member 64 by pivot pins 204. When the levers 203 are pivoted upwardly from their positions illustrated in FIG. 11, the pulleys 201 are moved toward each other to rotate the tubular members 71 and rods 70 against the force of springs 78 and simultaneously move the plates 76 to their raised positions. If the cables 82 are not released immediately and the turntable T is inadvertently over rotated to a position such that the plates 76 are just beyond the stop pins 12, before the cables 82 are released, the turntable T may be backed up so that the plates 76 which should not have traveled beyond the posts 12 in the direction of rotation will ride up and over the pins 12 and the assembly will automatically self-lock as these plates 76 drop to positions rearward of the pins 12 when the turntable has been sufficiently reversely rotated.

LATCH ASSEMBLY

Figure 2:
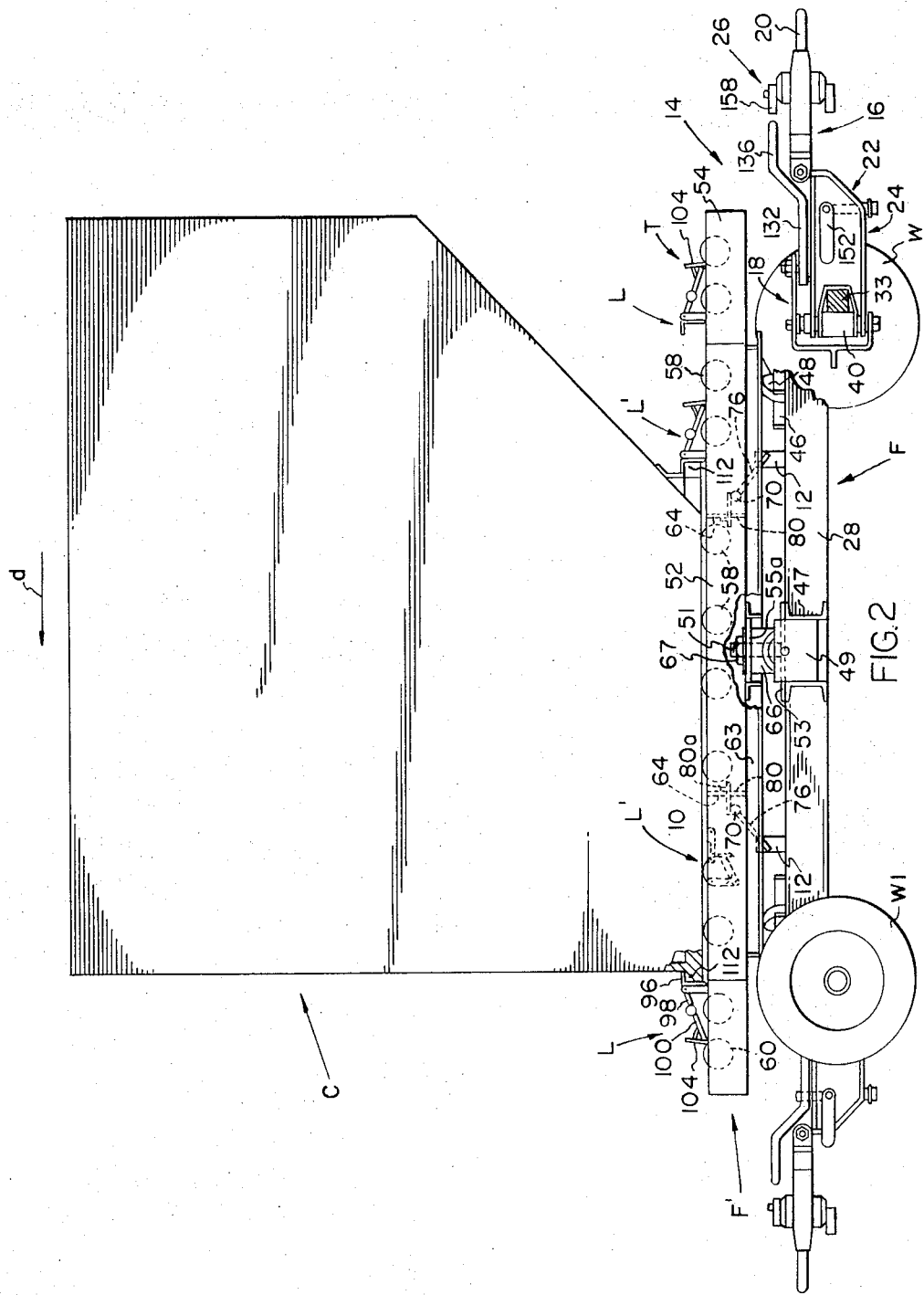
FIG. 2 is a side elevational view of the apparatus illustrated in FIG. 1 showing it supporting a baggage container which is held in position, parts being broken away to more clearly illustrate various portions thereof.
Figure 3:
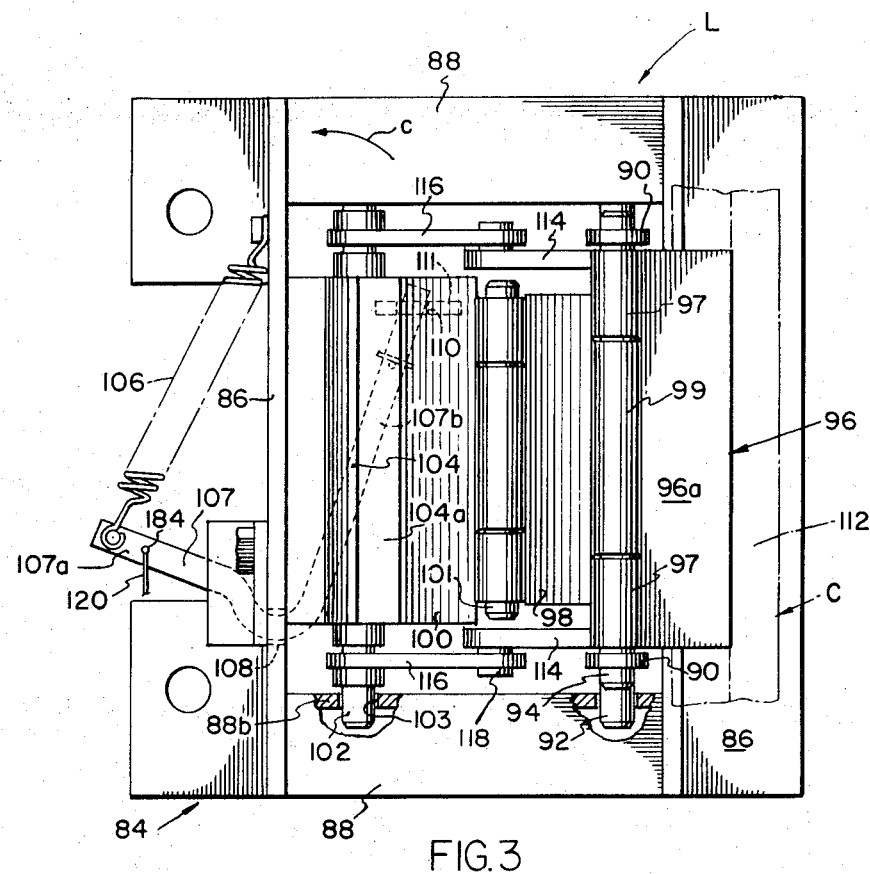
FIG. 3 is a top plan view illustrating one of the latch assemblies only in a retaining position, a part being broken away to more clearly illustrate the manner of supporting the pivotally mounted shafts.
Figure 4:
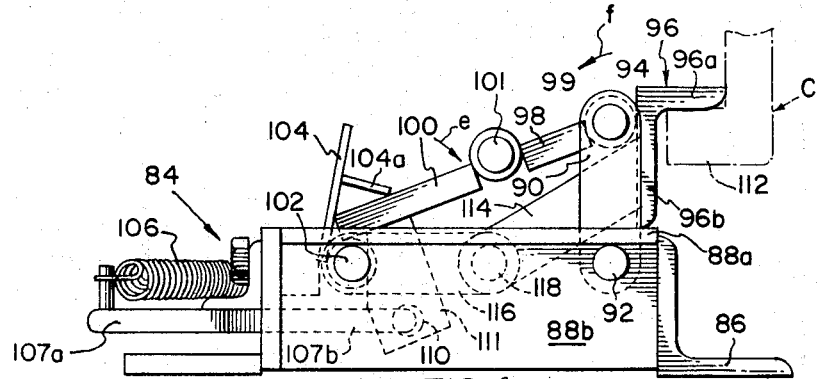
FIG. 4 is a side elevational view of the latch assembly illustrated in FIG. 3.
Figure 5:
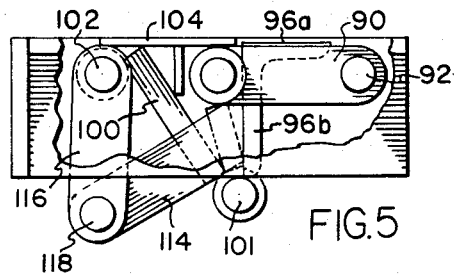
FIG. 5 is a fragmentary side elevational view, similar to FIG. 4, but illustrating the apparatus in a depressed, inoperative position flush with the surface of the frame, parts being broken away to more clearly illustrate various portions thereof.

The containers C are positioned on the platform T by a pair of outer stop or latch assemblies L and a pair of inner stop or latch assemblies L' mounted nearer the center of the platform T. When a container C of the shape illustrated in FIG. 2 is to be retained, one of the outer stop members L normally will cooperate with one of the inner stop members L' to clamp the containers in position. Referring now more particularly to FIGS. 3-5, each latch assembly L and L' includes a frame, generally designated 84, including a pair of spaced apart L-shaped end plates 86 spanned by a pair of inverted L-shaped side plates 88. The latch assemblies L are mounted to the rails 56 so that the flanges 88a of the plates 88 are flush with the upper surface of the frame members of the platform T. A pair of links 90 fixed at their lower ends on a shaft 92 journaled between the vertical legs 88b of the side plates 88, journal a shaft 94 at their upper ends. A hook-shaped latch 96 is constructed with a generally horizontally extending portion 96a which overlies a flange 112 on the container C and with a pair of integral collars 97 which are rotatably received on the shaft 94. A hinge plate 98 includes a collar 99 rotatably received on the shaft 94 between the collars 97 and is pivotally connected to a second hinge plate 100 by a hinge pin 101. The hinge plate 100 is fixed to a shaft 102 which is journaled in suitable apertures 103 provided in the side walls 88. Also fixed to the pivotal shaft 102 is an actuating lever 104 which has an actuating arm 104a adapted to bear on the hinge plate 100. It should be noted that the latches 96 at opposite ends of the platform T face each other to permit a container C to be moved onto the turntable from either end thereof.

The latch member 96 and hinges 100 and 98 are maintained in the raised, operative, position, illustrated in FIG. 4, by a spring 106 which is fixed at one end to one of the end plates 86 and its opposite end to one arm 107a of a rock rod 107 which passes through an enlarged aperture 108 in one of the end walls 86. The opposite leg 107b of the rock rod 107 is received in an opening 110 provided in a foot 111 depending from the hinge plate 100 to normally maintain the hinge plates 100 and 98 in the positions, illustrated in FIG. 4, in which they are expanded slightly beyond a center position with respect to hinge pin 100 so that any imposed force is transmitted by the hook-shaped stop 96 linearly through the plates 98 and 100 to the frame structure and is not required to be borne by the hinge pin structure. With this structure, forces tending to shear pins simply do not have to be borne by the pins as in some prior art devices.

The actuator plate 104 is operative to be swung clockwisely in FIG. 4 in the direction represented by the arrow *e* by a baggage container C being moved along the upper surface of the turntable T to fold the hinge plates 98 and 100 down to the position illustrated in FIG. 5. To maintain the hook-shaped latch 96 in substantially the same horizontal disposition, as it swings from the position shown in FIG. 4 to the position shown in FIG. 5, so that the horizontal leg portion 96a of the latch will be substantially flush with the surface of the platform T in the position shown in FIG. 5, and so, that the portion 96a will swing over the flange 112 on the container C, when moving to the latching position illustrated in FIG. 4, a pair of side links 114 are fixed to the vertical leg 96b of the latch member 96 and are rotatably connected to a pair of side links 116 by pivot pins 118. The side links 116 are journaled on the shaft 102. When the actuator plate 104 forces the hinge plate 100 downwardly in the direction represented by the arrow *e*, the shaft 94 is swung downwardly in the opposite direction, represented by the arrow *f*, about the axis of the shaft 92 so that the leg 96b moves downwardly to the left from the position illustrated in FIG. 4, to move the links 114 and 116 downwardly until they reach the positions illustrated in FIG. 5. As the hinge plate 100 moves in the direction illustrated by the arrow *e*, the rock rod 107, which is fulcrummed in the opening 108 in frame cross piece 86, is pivoted counterclockwisely in the direction represented by the arrow *c* (FIG. 3) to elongate the coil spring 106. Once the container C passes the latch L so that the rail 112 of the container is disposed beyond the lock or latch 96a, the assembly will expand again under the urging of spring 106 so that the horizontal portion 96a swings over the rail 112 of the container C.

Mechanism is provided for swinging rock rods 107 and releasing each pair of latch members L at each end of the platform T to permit a container C thereon to be removed. Since the mechanism for each end is identical, only the mechanism for one end will be described, it being understood that the mechanism is identical for the latches at the other end of the platform. The latch releasing mechanism includes slide bars 175 slidably mounted by brackets 176 supported on frame members 64 and having hooked ends 175b (FIG. 11B), hookable selectively when pulled from the normal position shown in FIG. 11 over bars 177c or 177d dependent on whether one or both of the latches are to be locked in down position. Cables 177, fixed at opposite ends to the levers 175 and the rock rods 107 of the outer latch assemblies L, are trained around sets of pulleys 177', 178, 179 on the frame F' and a floating pulley 181 journaled on a free-floating bearing block 182. The cables connect to the outer latch assemblies at 180. Cables 120, connected at opposite ends to the floating bearing blocks 182 and the rock rods 107 of the inner latch assemblies, are trained around pulleys 183. They connect to the inner latch assemblies at 184. When the levers 175 are pulled outwardly from the positions in which they are illustrated in FIG. 11, the cables 177 initially move the bearing blocks 182 inwardly to draw the cables 120 about pulleys 183 and pivot the rock rods 107 of the inner latch assemblies in the direction represented by the arrow c (FIG. 3). The inner latches may be locked in recessed position by hooking the ends 175b of slide bars 175 over bars 177c or, if desired, the levers 175 may be pulled further outwardly to draw the rock rods of the outer latch assemblies downwardly. If the ends 175b of slide bars 175 are then hooked over bars 177d the outer latch assemblies L, as well as the inner latch assemblies, will be locked in down position. There is adequate play in the slide openings in brackets 176 for the hooks 175b to be lifted off bars 177c or 177d. The portions of the stop assemblies L are bolted, or otherwise suitably secured, between the cross piece members 56 of the turntable T.

DRAFT ASSEMBLY

Each draft assembly 14 (FIGS. 6 - 10) includes a steering tongue member, generally designated 18, pivotally mounted on the pin 42, a relatively movable tongue assembly, generally designated 24, an aligning lever assembly, generally designated 132, and a tow bar, generally designated 16. The tongue member 18 is U-shaped and includes a mounting flange 128 at its rear end connected with the tie rods 38 by suitable pivot pins 130.

The movable tongue assembly 24 has upper and lower plate members 138 and 140 having openings 142 for receiving the pivot pin 42 to as to normally be freely pivotal thereon. A slot 138a is provided in the upper plate 138 for a purpose to be presently described. At its front end, the tongue assembly 24 is constructed with an integral collar or sleeve 142a for receiving a pin 143 on which the tow bar 16 is pivoted for up and down movement. The aligning lever assembly, generally designated 132, is pivoted on the plate 138 by a pin 126 and includes a slot 132a which receives a follower roller 124 supported on pin 134 depending from the U-shaped tongue member 18. The aligning lever 132 includes a portion 136 of reduced cross section which comprises a handle for swinging the lever 132 about the pivot 126 and moving the tongue member 18 relative to the tongue assembly 24. The slotted portion 132a is also provided for an additional purpose to be presently described.

To selectively lock the tongue assemblies 24 and 18 together to prevent relative movement therebetween, the lock assembly, generally designated 22, is provided and includes a pivotal cross shaft 148 journaled in the side walls 141 of the tongue assembly 24. When the slots 138a and 132a on the movable tongue 24 and aligning lever 132 are in vertical alignment, a lug or pin 150, fixed to a squared portion 149 on the shaft 148, is adapted to be pivoted 180 degrees from the chain line position, illustrated in FIG. 7, to the solid line position, shown in FIG. 9, up through the slots 138a and 132a by manipulating a pair of handles 152 fixed to the extremities of the pivotal shaft 148. When the pin 150 is in the "up" position, illustrated in FIG. 9, passing through the slots 138a and 132a, towing movement exerted on the tow bar 16 will be transmitted to the tongue part 24 and then to the steering tongue 18 and will steer the wheels of the vehicle. When it is desired to swing the tow bar 16 and movable tongue part 24 independently of the steering tongue 18 so that the tow bar 16 may be readily coupled to another vehicle without initially also moving the entire baggage cart or to release the movable tongue part 24 from steering tongue 18 to condition the cart for towing in the reverse direction, the handles 152 may be pivoted through 180 degrees from the position illustrated in FIG. 9 to the position shown in FIG. 7, to pivot the stop pin 150 to the "down" position, out of slots 132a and 138a. The tow bar 16 and assembly 24 are then free to be swung about the shaft 42 independently of steering tongue 18. The aligning lever 136 is particularly useful to condition a cart for steering in the reverse direction when the steering tongue parts 24 and 18 on the end of the cart which was being towed are out of alignment and must be aligned prior to moving locking pin 150 upwardly and locking the parts together. When the distance between the pivot pin 126 and follower roller 124 is relatively small, as normally is the case, the mechanical advantage obtained with the lever 132 is relatively large so that a minimum of force need be exerted on the handle 136 to swing the tongue member 18 relative to the tongue part 24. When the parts 24 and 18 are moved relatively, the roller 124 rides along the slot 132a which is of sufficient length to permit all necessary movement. Once the steering tongue parts 18 and 24 are aligned, the lock pin handles 152 may be grasped and used to restore the pin 150 to locked position.

A cylinder 162 is fixed to the bottom plate 140 of the movable tongue assembly 24 and receives a biasing pin 164 which is biased into engagement with the flatted portion 149 of the pivotal shaft 148 by a coil spring 166 received in the cylinder 162. A cap 168 is adjustably threaded on the terminal end of the cylinder 162 to vary the bias exerted by the spring 166.

TOW BAR INTERLOCKING MECHANISM

Each tow bar 16 includes an eye member 20 at its terminal end defining an aperture 154a therethrough for a purpose to be presently described. Mounted on the upper and lower sides of the tow bar 16 are fixed draw pins 156 and eccentrically mounted retaining discs 158 are pivoted eccentrically on the upper draw pins 156 by pivot pins 160. Rods 158a forming ring receiving hooks may be fixed to the lower draw pins 150 (see FIG. 7) or the pivotal discs 158 may be used (see FIG. 10). The draw pins 156 are spaced an equal distance from their respective eye members 20 so that the tow bars of adjacent carts may be coupled together. When hooks 158a are provided, the rings 20 have sufficient play to permit disengagement.

To lock a tow bar designated 16' (FIG. 10) to an adjacent tow bar 16", the eccentrically mounted retaining member 158' is aligned with the draw pin 156' on the upper side of the tow bar 16' whereas the eccentric member 158" on the underside of the tow bar 16" is aligned with the draw pin 156" to permit the draw pins 156' and 156" to simultaneously pass through the apertures 154" and 154' respectively, of the tow bars 16" and 16' respectively. After the draw pins 156' and 156" are so positioned, the retaining members 158' and 158" are swung to the offset positions overlying portions of the eye members 20" and 20' for locking their respective draw pins in position.

THE OPERATION

The turntable T may be initially aligned on the frame F so that the conveyor rolls 58 are either longitudinally or crosswisely disposed. A baggage container C is pushed onto the turntable T, for instance, in the direction of the arrow d illustrated in FIG. 2, to engage the actuator plates 104 of the two right-hand (as viewed in FIG. 2) latch assemblies L to swing the links 98 and 100 thereof from the positions illustrated in FIG. 4 to the positions illustrated in FIG. 5. The inner latch assembly, designated L' on the left side of the platform as viewed in FIG. 2, will be manually moved to the retracted position to permit the container C to be moved thereover into engagement with the outer latch assembly L on the opposite left-hand end of the trailer so that the rail 112 of the container C is received under the latch member 96. The two right-hand latch members, as viewed in FIG. 2, will be spring-returned to the raised retaining positions illustrated in FIG. 2, after the rearward retaining bar 112 of the container C passes thereby, so that the latch member 96 on the inner latch L will hold the retaining bar 112 to the frame F'. Assuming the rolls 58 have been crosswisely disposed, one of the levers 203 is then swung upwardly so that the turntable lock members 10 will be pivoted to the raised position so as to clear the posts 12 and the underside of the frame on the turntable T to permit the turntable T to be rotated 90°, at which time the stop plates 76 are permitted to return, under the force of springs 78, to the lowered positions to engage behind the upstanding posts 12, and lock the turntable T in position relative to the frame F for towing.

To couple one cart to another, the handles 152 on the tow bar to be coupled are swung to the position illustrated in FIG. 7 to permit the draft bar 16 to be swung relative to the tongue assembly 18 so that it may be aligned with the draft pin 156 of an adjacent tow bar 16. The eccentric members 158 and the draw pins 156 are aligned so that they may easily pass through the apertures 154 in the draft rings 20 of the adjacent tow bars 16. After the draw pins are inserted in the apertures 154, the eccentric discs 158 are swung to the positions illustrated in FIG. 10 to interlock the tow bars. After the handle 136 is grasped to move the tongue parts 18 and 24 into alignment so that the slots 132a and 138a are in alignment, the handles 152 may then be returned to the position illustrated in FIG. 9 so that relative movement between the tow bar 16 and the tongue assembly 18 may be prevented.

Before the container C is unloaded, one of the levers 203 can again be swung to the raised position so that the turntable locking plates 76 are moved to their unlocking positions and platform T may be turned to a 90° or 180° turned position to permit either sidewise or endwise unloading. When the container C is to be removed from one end of the platform T, the lever 175 at the other end of the platform is pulled outward to move the cable 177 and swing the retaining plates 96 on the latches L at the one end of the platform to their recessed positions, illustrated in FIG. 5, so that the container C will pass thereover as it is pushed along the conveyor rollers 58.

In use, the carts are connected in a long train and frequently it will be desirable to condition the carts for steering from the opposite direction. This is readily accomplished, without decoupling the carts in the manner described by locking the steering tongue parts 24 and 18 at one end of each cart and unlocking them at the other. Necessary alignment to permit the locking of formerly unlocked and misaligned parts 18 and 24 is easily accomplished because of the mechanical advantage obtained using levers 136.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. In a train of tandemly coupled carts for baggage containers and the like, each cart including a chassis and front and rear pairs of road engagable wheels mounted on said chassis for rotation about front and rear axes, each of said carts including a tow bar connected to at least one of said pair of wheels for controlling their direction of travel, each of said tow bars including an eye member defining an aperture therethrough for receiving a draw pin; a draw pin on each of said tow bars for passing through the aperture in the eye of an adjacent tow bar; draw pin retaining and locking members eccentrically mounted on said draw pins and movable between positions axially aligned with the draw pins so that the draw pins and retaining members may pass through the apertures in the tow bars of adjacent carts and offset positions overlying portions of the eyes of the adjacent tow bars.

2. The combination set forth in claim 1 wherein said first mentioned draw pins are mounted on the upper sides of said tow bars and additional draw pins are mounted on the under sides of said tow bars; additional draw pin retaining and locking members being eccentrically mounted on said additional draw pins and movable between positions axially aligned therewith and axially offset positions.

3. The combination set forth in claim 1 wherein the eye members are at the terminal ends of said tow bars and said draw pins are equidistantly spaced from the apertures in their respective tow bars.

4. The combination as set forth in claim 3 wherein a tow bar is connected to each of said front and rear pairs of wheels on each cart so that each cart may be connected in train to carts on opposite ends.

5. Apparatus for removably coupling one surface vehicle to another surface vehicle comprising: a tow bar including an eye member defining an aperture therethrough; draw pins on opposite sides of said tow bar spaced from said eye member; a retaining member eccentrically mounted on at least one of said draw pins for movement between a position in alignment with said one draw pin and an offset locking position.

6. The apparatus as set forth in claim 5 wherein an additional retaining member is eccentrically mounted on the other of said draw pins for movement between a position in alignment with said other of said draw pins and a non-aligned, locking position.

* * * * *

UNITED STATES PATENT OFFICE
CERTIFICATE OF CORRECTION

Patent No. 3,764,165                Dated   October 9, 1973

Inventor(s) Leo E. Hearn

It is certified that error appears in the above-identified patent and that said Letters Patent are hereby corrected as shown below:

Column 3, line 28, after "L", insert -- or L' --.

Column 5, line 12, change "71" to -- 73 (Figure 11A) --; same line before "frame" insert -- brackets 71 provided on the --;  line 14, before "rods" insert -- stop plate mounting --;  lines 15 and 17 before "member" insert -- stop plate --;  lines 20 and 28, change "71" to -- 73 --.

Column 6, line 1, change "88" to -- 88b --.

Column 9, lines 56 and 58, change "154" to -- 154a --.

Signed and sealed this 20th day of August 1974.

(SEAL)
Attest:

McCOY M. GIBSON, JR.                C. MARSHALL DANN
Attesting Officer                   Commissioner of Patents